United States Patent
Katou et al.

(10) Patent No.: US 9,187,130 B2
(45) Date of Patent: Nov. 17, 2015

(54) VEHICLE BODY LATERAL STRUCTURE

(75) Inventors: Yasuyuki Katou, Wako (JP); Hirokuni Kumekawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/236,176

(22) PCT Filed: May 17, 2012

(86) PCT No.: PCT/JP2012/062614
§ 371 (c)(1),
(2), (4) Date: Jan. 30, 2014

(87) PCT Pub. No.: WO2013/018415
PCT Pub. Date: Feb. 7, 2013

(65) Prior Publication Data
US 2014/0159433 A1    Jun. 12, 2014

(30) Foreign Application Priority Data
Aug. 2, 2011 (JP) ................................ 2011-169486

(51) Int. Cl.
*B62D 25/02* (2006.01)
*B62D 25/04* (2006.01)
*B62D 25/08* (2006.01)
*B62D 25/20* (2006.01)

(52) U.S. Cl.
CPC ............... *B62D 25/02* (2013.01); *B62D 25/04* (2013.01); *B62D 25/087* (2013.01); *B62D 25/2036* (2013.01)

(58) Field of Classification Search
CPC ...... B62D 25/02; B62D 25/04; B62D 25/087; B62D 25/2036
USPC .................................................. 296/203.03
See application file for complete search history.

(56) References Cited

U.S. PATENT DOCUMENTS 7,364,225 B2 *    4/2008    Tomioka ................. 296/203.04

FOREIGN PATENT DOCUMENTS

| JP | H03-044079 | 4/1991 |
| JP | 2001-048051 | 2/2001 |
| JP | 2007-210531 | 8/2007 |
| JP | 2008-284936 | 11/2008 |

* cited by examiner

*Primary Examiner* — Glenn Dayoan
*Assistant Examiner* — Melissa A Black
(74) *Attorney, Agent, or Firm* — Rankin, Hill & Clark LLP

(57) ABSTRACT

A vehicle body lateral section contains an upper stiffener, which extends upward from a rear wheel housing and overlaps a bottom end of a pillar inner. The upper stiffener is provided with an extension that continues to the pillar inner. The vehicle body lateral section has: a first closed-cross-section section formed from the rear wheel housing and the upper stiffener; and a second closed-cross-section section formed from the pillar inner and a pillar stiffener.

4 Claims, 9 Drawing Sheets

VEHICLE BODY LATERAL STRUCTURE

TECHNICAL FIELD

The present invention relates to a vehicle body lateral structure or side vehicle body structure provided near a vehicle's road wheel.

BACKGROUND ART

Among the conventionally-known side vehicle body structures is one disclosed, for example, in Patent Literature 1, in which a suspension tower reinforcement member supporting an upper portion of a damper is mounted on a baggage-compartment-side surface of a wheel house (suspension tower section) disposed over a road wheel and in which a C pillar section extends upward from an upper portion of the suspension tower reinforcement member and an upper portion of the wheel house, overlapping the upper portion of the suspension tower reinforcement member, to a roof of the vehicle. Further, in the side vehicle body structure disclosed in Patent Literature 1, an upper connection gusset and a lower gusset extend from above the damper to a rear gate opening section, and thus, a rear collision load can be dispersed to upper portions of the vehicle body.

However, the side vehicle body structure disclosed in Patent Literature 1 requires an increased number of component parts and thus increases the weight of the vehicle body, although it can achieve increased strengths at and around the gate opening section, C pillar section and suspension tower reinforcement member. Further, because a first closed-sectional shape is defined over the wheel house (part of the suspension tower section) in conjunction with the suspension tower reinforcement member and also a second closed-sectional shape is defined in upwardly spaced-apart relation to the first closed-sectional shape as shown in FIG. 3 of the patent literature, an upthrust load can concentrate on a portion between the first and second closed-sectional shapes and thus that portion may undesirably lack rigidity and strength.

PRIOR ART LITERATURE

Patent Literature 1: Japanese Patent Application Laid-Open Publication No. 2008-284936

SUMMARY OF INVENTION

Technical Problem

In view of the foregoing prior art problems, it is an object of the present invention to provide an improved side vehicle body structure which has an increased strength against a load input via the damper.

Solution to Problem

According to one aspect of the invention, there is provided a side vehicle body structure, which comprises: left and right rear wheel houses extending upward from vehicle-widthwise outer side portions of a floor section constituting a rear floor of a vehicle body; upper stiffeners joined to corresponding ones of the rear wheel houses and protruding toward a middle of a passenger compartment; and pillars extending upward from the corresponding ones of the rear wheel houses and each including an inner pillar member protruding toward the middle of the passenger compartment, each of the upper stiffeners having an extension extending upward from the corresponding rear wheel house to be superposed on the lower end of the inter pillar member so that the upper stiffener connects to the inner pillar member via the extension section.

Preferably, each of the rear wheel houses has a first closed-sectional portion formed by the upper stiffener being joined thereto, each of the pillars includes a pillar stiffener closing an opening of the inner pillar member by being joined to an outside of a passenger compartment in opposed relation to the inner pillar member, and a second closed-sectional portion defined by the inner pillar member and the pillar stiffener and extending in an up-down direction of the side vehicle body structure. The pillar stiffener includes a lower-end extension extending downward beyond the lower end of the inner pillar member, the lower-end extension being located in overlapping relation to the extension section of the upper stiffener.

Preferably, each of the rear wheel houses includes: an inner rear wheel house member disposed proximate to the passenger compartment; an outer rear wheel house member disposed outside of the passenger compartment and joined to an end portion of the inner rear wheel house member; and a lower stiffener joined from below to the inner rear wheel house member and the outer rear wheel house member in superposed relation to the inner rear wheel house member and the outer rear wheel house member. The upper stiffener is disposed on a surface of the inner rear wheel house member facing toward the passenger compartment, a lower end of the lower-end extension is joined to the upper surface of the outer rear wheel house member, and the lower stiffener overlaps the upper stiffener and the pillar and has a vehicle-widthwise outer side portion that extends to a joint portion of the outer rear wheel house member having the pillar stiffener joined thereto.

Preferably, the inner pillar member has a reinforcing member for reinforcing the lower end superposed on the extension section.

Preferably, the upper stiffener has a substantially U sectional shape defined by: a first upper side section; a second upper side section opposed to the first upper side section; a third upper side section extending from the first upper side section to the second upper side section; and an upper ridge line section defined by respective ridge lines of the first, second and third upper side sections, and the inner pillar member has a substantially U sectional shape defined by: a first pillar side section; a second pillar side section opposed to the first pillar side section; a third pillar side section extending from the first pillar side section to the second pillar side section; and a pillar ridge line section defined by respective ridge lines of the first, second and third pillar side sections, the upper ridge line section and the pillar ridge line section connect with each other.

Preferably, the side vehicle body structure further comprises a roof side rail connected to the upper end of the pillar, and the pillar ridge line section of the inner pillar member curves forward or rearward along a longitudinal direction of the roof side rail.

Advantageous Effects of Invention

According to one aspect of the invention, the upper stiffener has the extension that extends upward from the rear wheel house to be superposed on the lower end of the inter pillar member so that the sectional shape of the upper stiffener can connect to the sectional shape of the inner pillar member via the extension section. As a consequence, the present invention can increase a vertical strength, i.e. strength in a vertical or up-down direction of the vehicle body structure, from the rear wheel house to the inner pillar member. Particularly, because the rear wheel house has a damper-supporting point (damper mounting section) for a rear road wheel, an upthrust load from the damper can be appropriately borne with the sectional shape having a great strength, and thus, the present invention can advantageously increase traveling stability and reduce vibrations of the vehicle.

Further, according to another aspect, the rear wheel house has the first closed-sectional portion formed by the upper stiffener being joined thereto. The pillar includes the pillar stiffener closing the opening of the inner pillar member, and the second closed-sectional portion defined by the inner pillar member and the pillar stiffener and extending in the up-down or vertical direction of the side vehicle body structure. The pillar stiffener includes the lower-end extension extending downward beyond the lower end of the inner pillar member, and the lower-end extension is located in overlapping relation to the extension section of the upper stiffener. Thus, with the first closed-sectional portion and second closed-sectional portion each having a closed sectional shape, the extending section interconnecting the first closed-sectional portion and the second closed-sectional portion as well as the lower-end extension of the pillar stiffener, the present invention can even further increase the vertical strength from the rear wheel house to the pillar.

Further, according to another aspect, the rear wheel house includes the inner rear wheel house member, the outer rear wheel house member and the lower stiffener. The upper stiffener is disposed on the surface of the inner rear wheel house member facing toward the passenger compartment, the lower end of the lower-end extension is joined to the upper surface of the outer rear wheel house member, and the lower stiffener overlaps the upper stiffener and the pillar and has the vehicle-widthwise outer side portion that extends to the joint portion of the outer rear wheel house member having the pillar stiffener joined thereto. Thus, the first and second closed-sectional portions can be formed in such a manner as to connect to each other, by the lower stiffener via the inner and outer rear wheel house members.

Further, according to another aspect, the inner pillar member has the reinforcing member for reinforcing the lower end superposed on the extension section. Thus, although stress tends to concentrate on the part where the inner pillar member is joined to the upper stiffener, the reinforcing member can disperse the load, with the result that the present invention can even further increase the vertical strength from the rear wheel house to the pillar.

Further, according to another aspect, the upper ridge line section of the upper stiffener and the pillar ridge line section of the inner pillar member connect with each other, and thus, the present invention can even further increase the vertical strength from the rear wheel house to the pillar.

Further, according to another aspect, the pillar ridge line section of the inner pillar member smoothly curves forward or rearward along the longitudinal direction of the roof side rail. Thus, transmission efficiency of a load from the pillar to the roof side rail can be increased, and an upthrust load from the damper can also be transmitted to the roof side rail with an increased efficiency. As a result, the present invention can even further increase the vertical strength from the rear wheel house to the pillar and then to the roof side rail.

DESCRIPTION OF EMBODIMENTS

Embodiments

Figure 1:
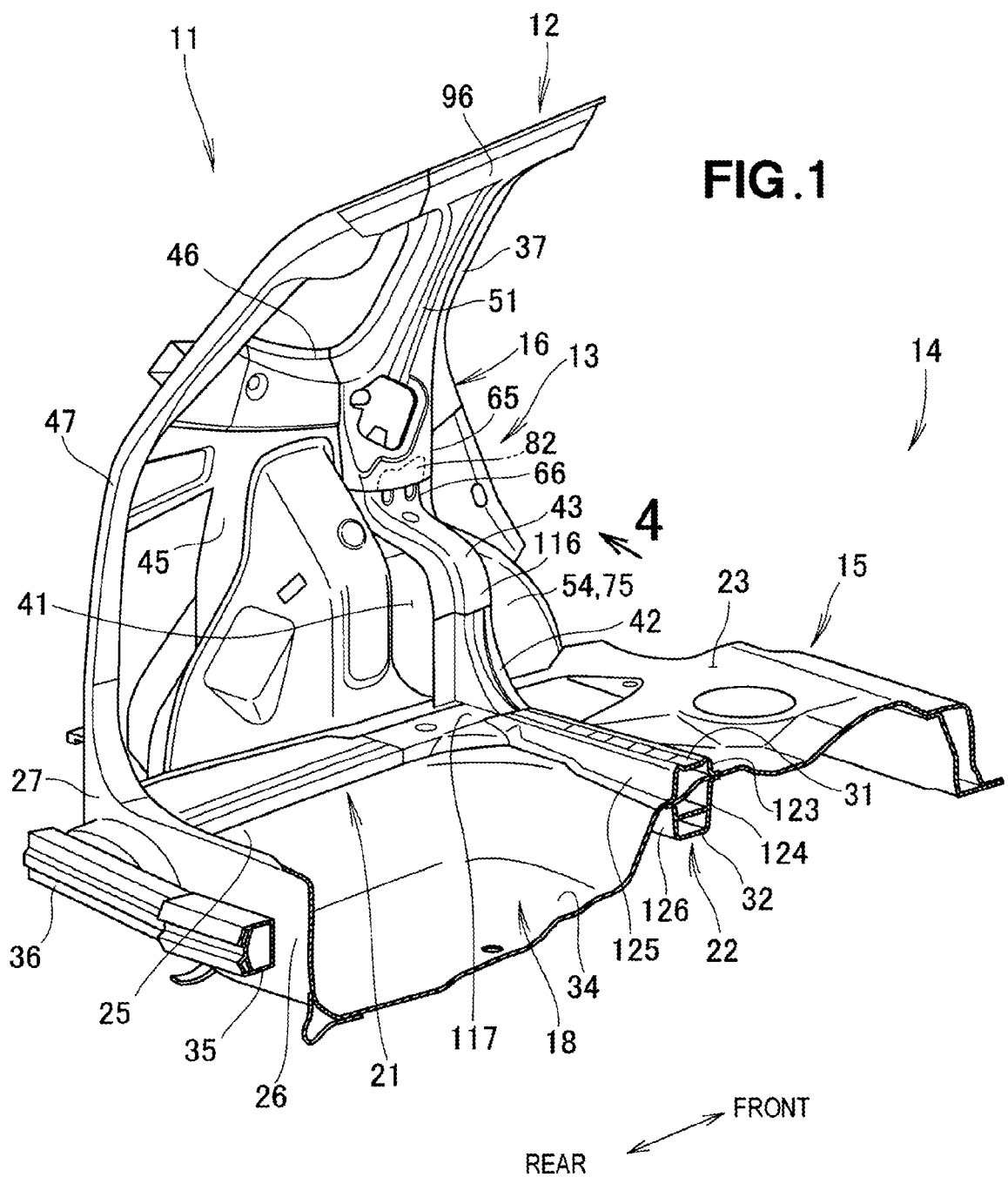
FIG. 1 is a perspective view showing a rear side section of a vehicle body in an embodiment of the present invention.
Figure 2:
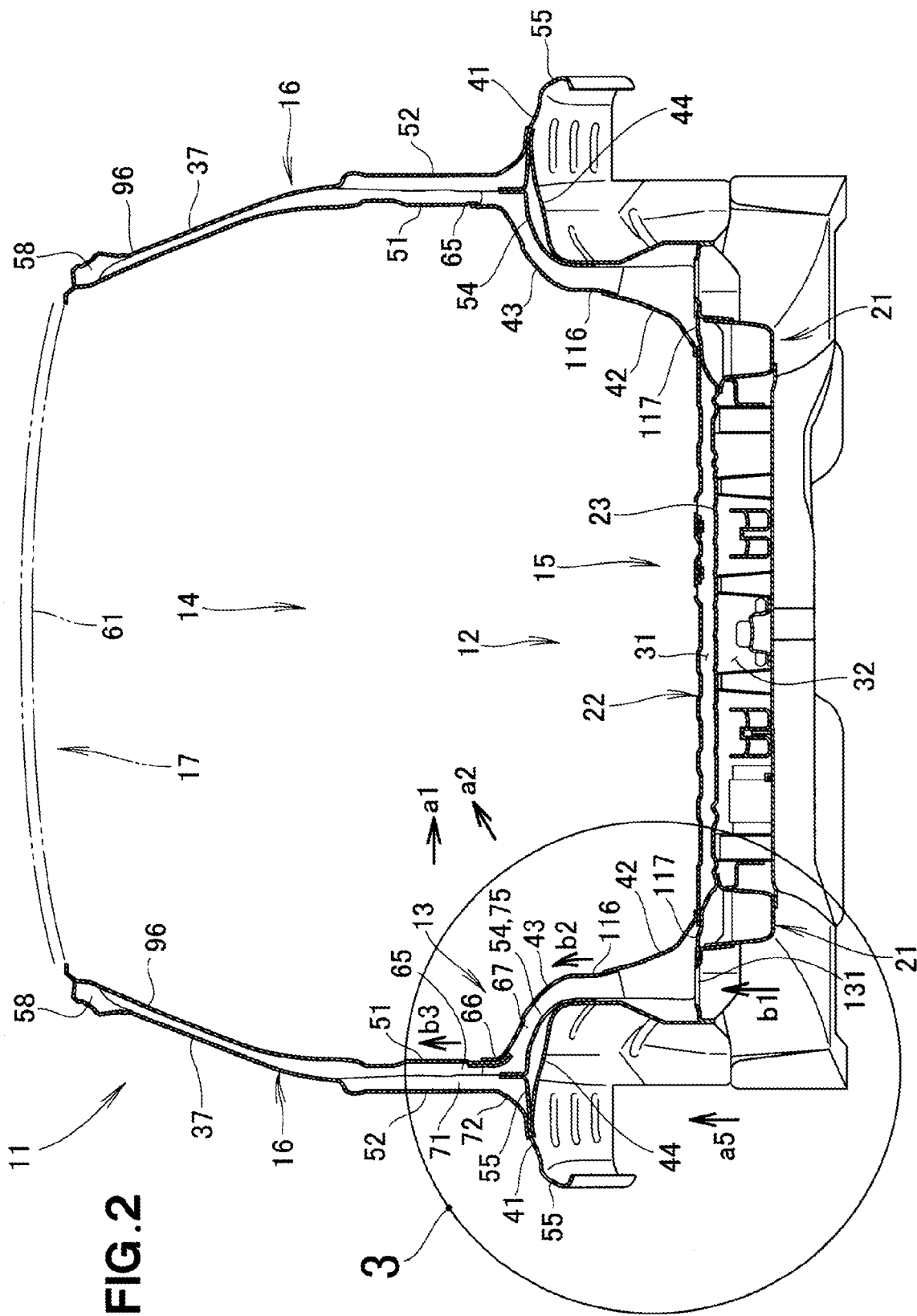
FIG. 2 is a rear sectional view of the rear side section of the vehicle body shown in FIG. 1.

FIG. 1 shows a rear section of a vehicle body 12. As shown in FIGS. 1 and 2, a vehicle 11 includes a rear side section 13 of the vehicle body (i.e. side vehicle body section 13) employing an embodiment of the present invention. As shown in FIGS. 1 to 10, the vehicle body 12 includes an underbody 15 constituting a floor of a passenger compartment 14, left and right side bodies 16 constituting left and right side walls of the passenger compartment 14, and a roof 17. The underbody 15 and the side bodies 16 include a rear body defining a baggage compartment 18.

The underbody 15 includes: left and right rear side frames 21 disposed on left and right sides of the vehicle 11 and extending in a front-rear direction of the vehicle 11; a rear floor cross member 22 joined at its opposite ends to the left and right rear side frames 21 in a perpendicular relation to the latter and extending in a vehicle width direction; a rear floor panel 23; a rear end panel 26 joined at its opposite ends to the rear ends 25 of the left and right rear side frames 21; and a rear end panel stiffener 27.

The rear floor cross member 22 includes an upper rear floor cross member element 31 joined to the upper surface of the rear floor panel 23, and a lower rear floor cross member element 32 joined to the lower surface of the rear floor panel 23. Namely, the rear floor cross member 22 is divided in a pair of upper and lower elements 31 and 32 that are interconnected via the rear floor panel 23 to thereby define upper and lower close-sectional shapes.

The rear floor panel 23 has a tire-accommodating recess 34 formed therein. A bumper beam 35 is connected at it opposite end portions 36 to the rear ends 25 of the left and right rear side frames 21. The left and right side bodies 16 extend upward from the left and right rear side frames 21, respectively.

Each of the left and right side bodies 16 includes: a quarter pillar 37; a rear wheel house 41 connecting to the quarter pillar 37; a wheel house gusset 42; an upper stiffener 43; a lower wheel house stiffener 44; a rear side panel 45; a quarter member 46: and a left or right rear pillar 47.

The quarter pillar 37 includes an inner pillar member 51 and a pillar stiffener 52. A not-shown outer pillar member is fixed to the outer surface of the pillar stiffener 52, and the outer pillar member is joined to the inner pillar member 51. The rear wheel house 41 includes an inner rear wheel house member 54 and an outer rear wheel house member 55.

Figure 10:
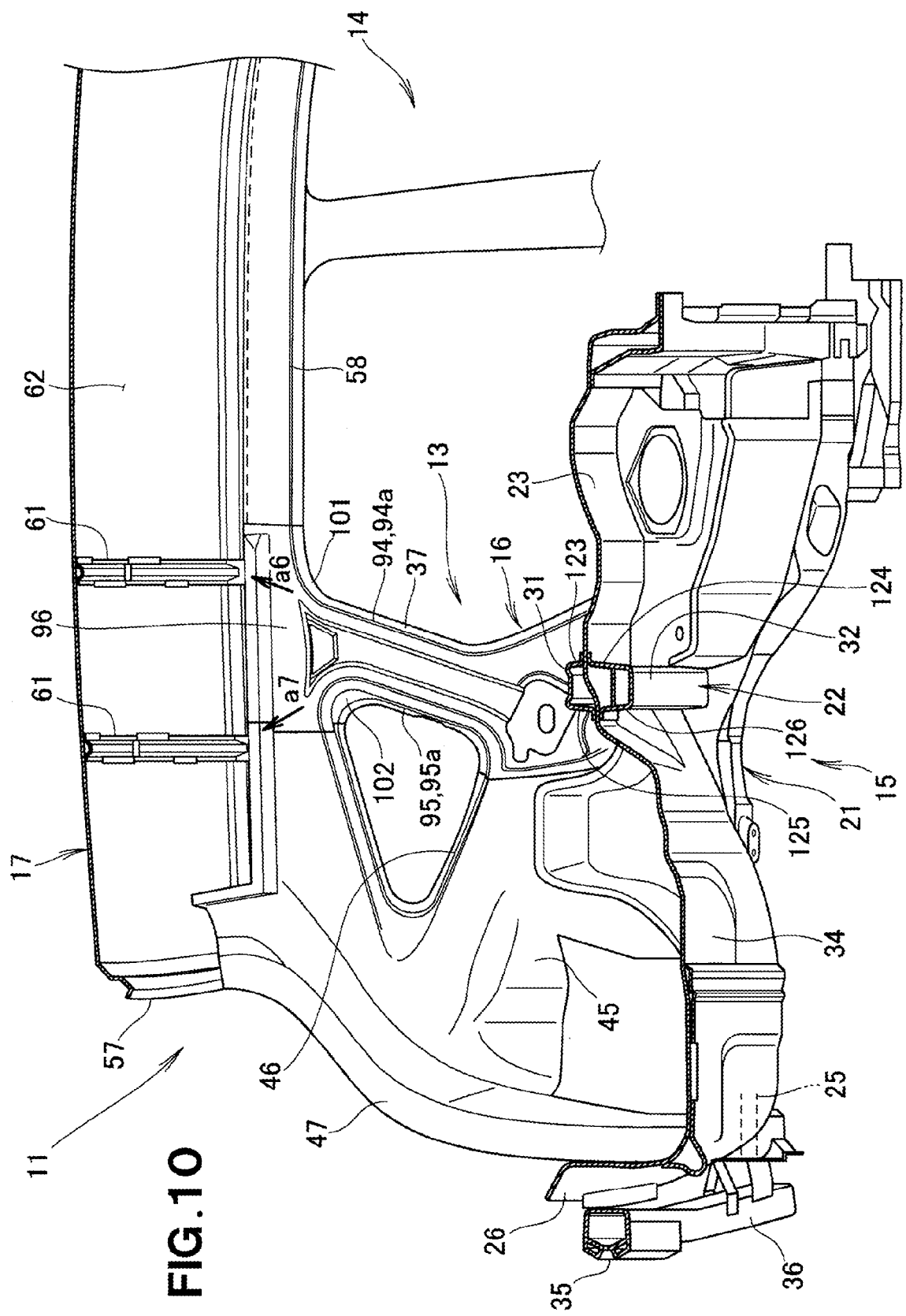
FIG. 10 is a bottom perspective view of the rear side section of the vehicle body shown in FIG. 1.

As shown in FIG. 10, the roof 17, which is connected to the left and right side bodies 16, includes: a rear roof side rail 57 connected to the rear pillar 47; left and right roof side rails 58 connecting to the left and right side bodies 16; a roof arch 61 joined to the left and right roof side rails 58; and a roof panel 62.

Each of the left and right roof side rails 58 is connected to the left or right side body 16 and constitutes a part of the side body 16. Each of the left and right roof side rails 58 is connected to the quarter pillar 37 of the side vehicle body section 13.

The following describe, with reference to FIGS. 1 to 11, main structural features of the side vehicle body section 13. The side vehicle body section 13 includes: the left and right rear wheel houses 41 extending upward from opposite vehicle-widthwise outer side portions (rear side frames 21) of a rear floor section (underbody 15) constituting a rear floor of the vehicle body 12; the upper stiffeners 43 joined to the rear wheel houses 41 and each having a sectional shape protruding toward the middle of the passenger compartment 14 as indicated by arrows a1 and a2; and the quarter pillars 37 each having a sectional shape extending upward from one of the rear wheel houses 41 and protruding toward the middle of the passenger compartment 14.

The upper stiffener 43 extends upward from the corresponding rear wheel house 41 so as to be superposed on the lower end 65 of the inner pillar member 51, thereby constituting an extension section 66 where the upper stiffener 43 and the inner pillar member 51 connect with each other.

The rear wheel house 41 has a first closed-sectional portion 67 formed by the upper stiffener 43 being joined to the rear wheel house 41. The pillar (quarter pillar) 37 includes the pillar stiffener 52 closing an opening 68 (FIGS. 3 and 6) of the inner pillar member 51 by being joined to the outside of the passenger compartment 14 in opposed relation to the inner pillar member 51, and a second closed-sectional portion 71 defined by the inner pillar member 51 and the pillar stiffener 52 and extending in a vertical or up-down direction of the side vehicle body structure.

The pillar stiffener 52 has a lower-end extension 72 extending downward beyond the lower end 65 of the inner pillar member 51. As the vehicle is viewed sideways as indicated by arrow a3 or a4 in FIGS. 3 and 5, the lower-end extension 72 is disposed in overlapping relation to an extension section 66 of the upper stiffener 43.

The rear wheel house 41 includes: the inner rear wheel house member 54 disposed proximate to the passenger compartment 14; the outer rear wheel house member 55 disposed outside of the passenger compartment 14 and joined to an end portion 73 of the inner rear wheel house member 55; and the lower stiffener (lower wheel house stiffener) 44 joined from below to the inner rear wheel house member 54 and the outer rear wheel house member 55 in superposed relation to the latter.

In other words, the lower stiffener 44 connects to the outer surfaces of inner rear wheel house member 54 and the outer rear wheel house member 55. The rear wheel house 41 has an outer surface opposed to the outer peripheral surface of the road wheel.

The upper stiffener 43 is disposed on a surface 75 of the inner rear wheel house member 54 facing toward the passenger compartment (passenger-compartment-side inner surface 75), and the pillar stiffener 52 is joined at the lower end 76 of the lower-end extension 72 to the upper surface 77 of the outer rear wheel house member 55. The lower stiffener (lower wheel house stiffener) 44 overlaps the upper stiffener 43 and pillar (quarter pillar 37) and has a vehicle-widthwise outer side portion 78 that extends to a joint portion 81 of the outer rear wheel house member 55 having the pillar stiffener 52 joined thereto.

The inner pillar member 51 has a reinforcing member 82 (FIGS. 3 and 4) superposed on the extension section 66 of the upper stiffener 43. The reinforcing member 82 is superposed on and joined to the lower end 65 of the reverse side 51a of the inner pillar member 51.

Figure 7:
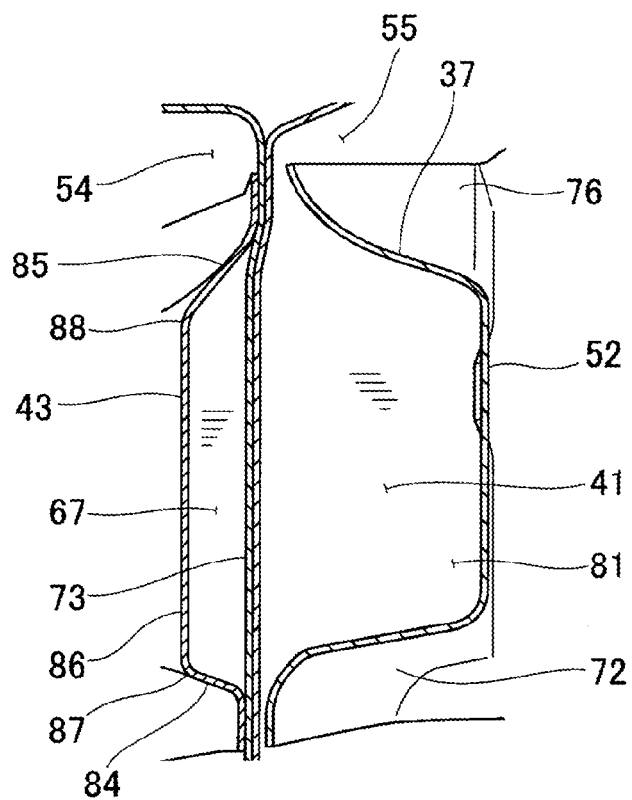
FIG. 7 is an enlarged sectional view taken along line 7-7 of FIG. 5.
Figure 8:
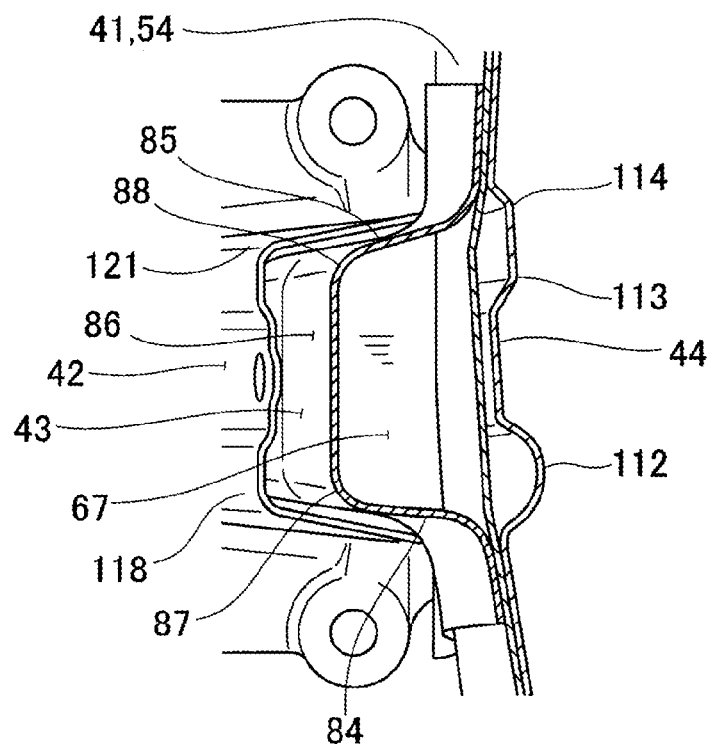
FIG. 8 is an enlarged sectional view taken along line 8-8 of FIG. 5.

Further, as shown in FIGS. 7 and 8, the upper stiffener 43 has a substantially U sectional shape defined by: a first upper side section 84; a second upper side section 85 opposed to the first upper side section 84; a third upper side section 86 extending from the first upper side section 84 to the second upper side section 85; and upper ridge line sections 87 and 88 defined by respective ridge lines of the sections 84, 85 and 86.

Figure 6:
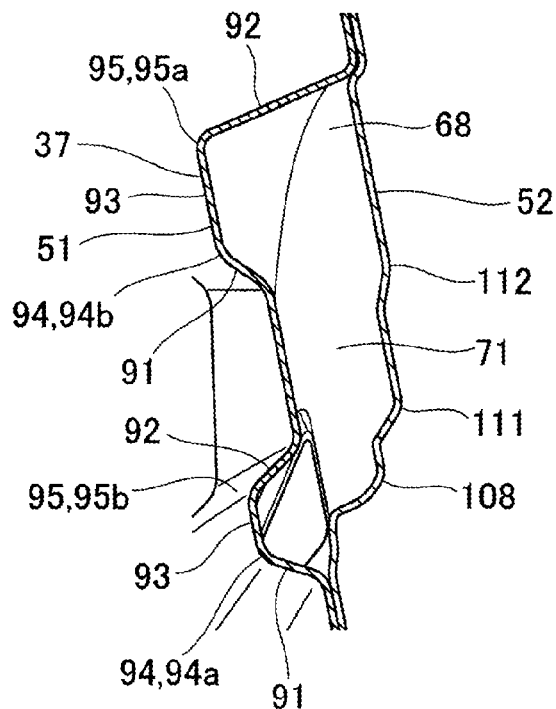
FIG. 6 is an enlarged sectional view taken along line 6-6 of FIG. 5.

Further, as shown in FIG. 6, the inner pillar member 51 has a substantially U sectional shape defined by: a first pillar side section 91; a second pillar side section 92 opposed to the first pillar side section 91; a third pillar side section 93 extending from the first pillar side section 91 to the second pillar side section 93; and pillar ridge line sections 94 and 95 defined by respective ridge lines of the sections 91, 92 and 93. The above-mentioned upper ridge line section 87 and the pillar ridge line section 94 (94a) connect with each other, and the above-mentioned upper ridge line section 88 and the pillar ridge line section 95 (95a) connect with each other (see FIGS. 4 and 11).

Further, as shown in FIG. 10, the side vehicle body section 13 includes the roof side rail 58 connected to the upper end 96 of the pillar (quarter pillar) 37. The pillar ridge line sections 94 (94a) and 95 (95a) of the inner pillar member 51 (FIG. 3) curve forward or rearward along a longitudinal direction of the roof side rail 58; that is, the pillar ridge line section 94 (94a) has a forwardly curved section 101, and the pillar ridge line section 95 (95a) has a rearwardly curved section.

Figure 3:
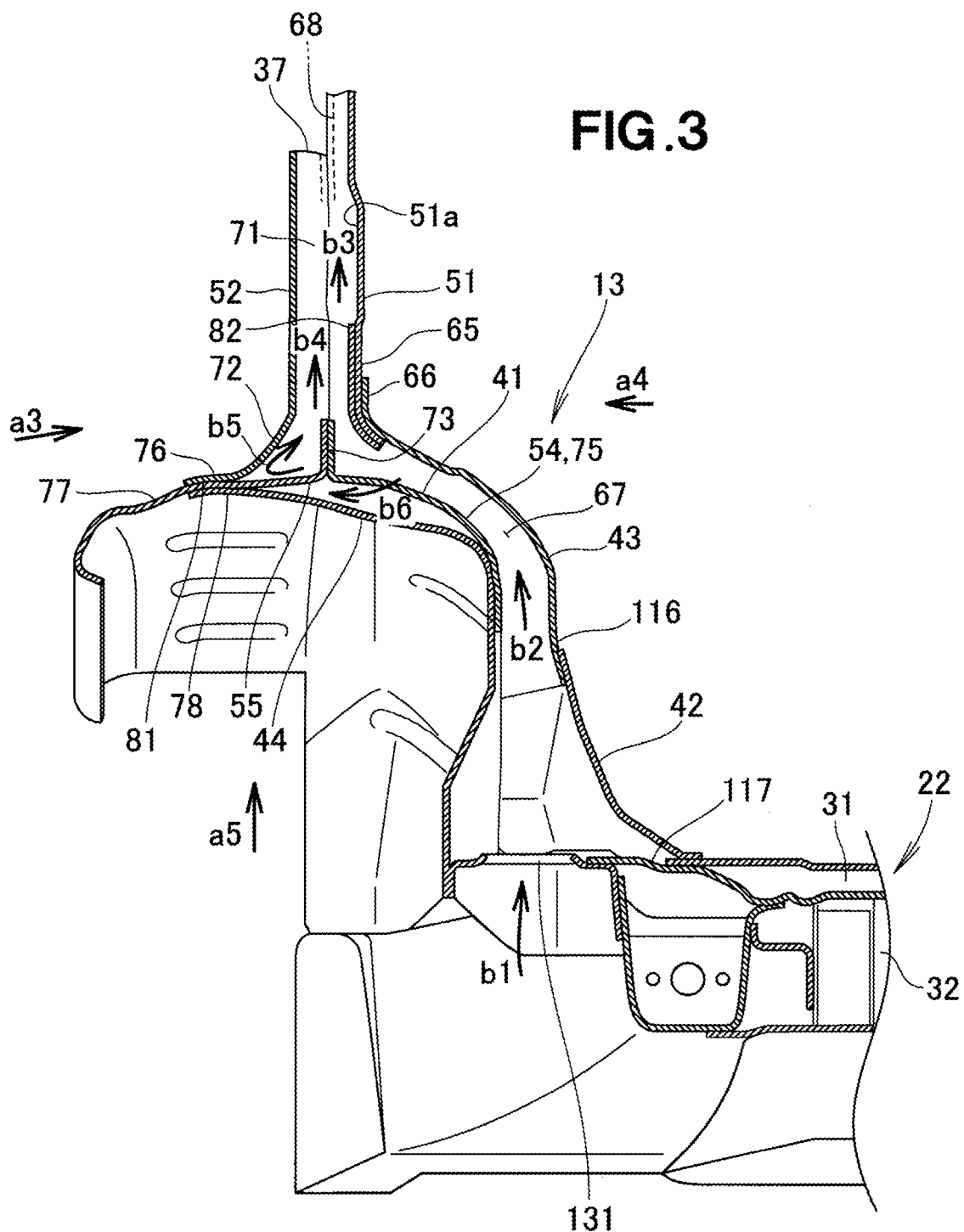
FIG. 3 is an enlarged fragmentary view of a region encircled at 3 in FIG. 2.
Figure 11:
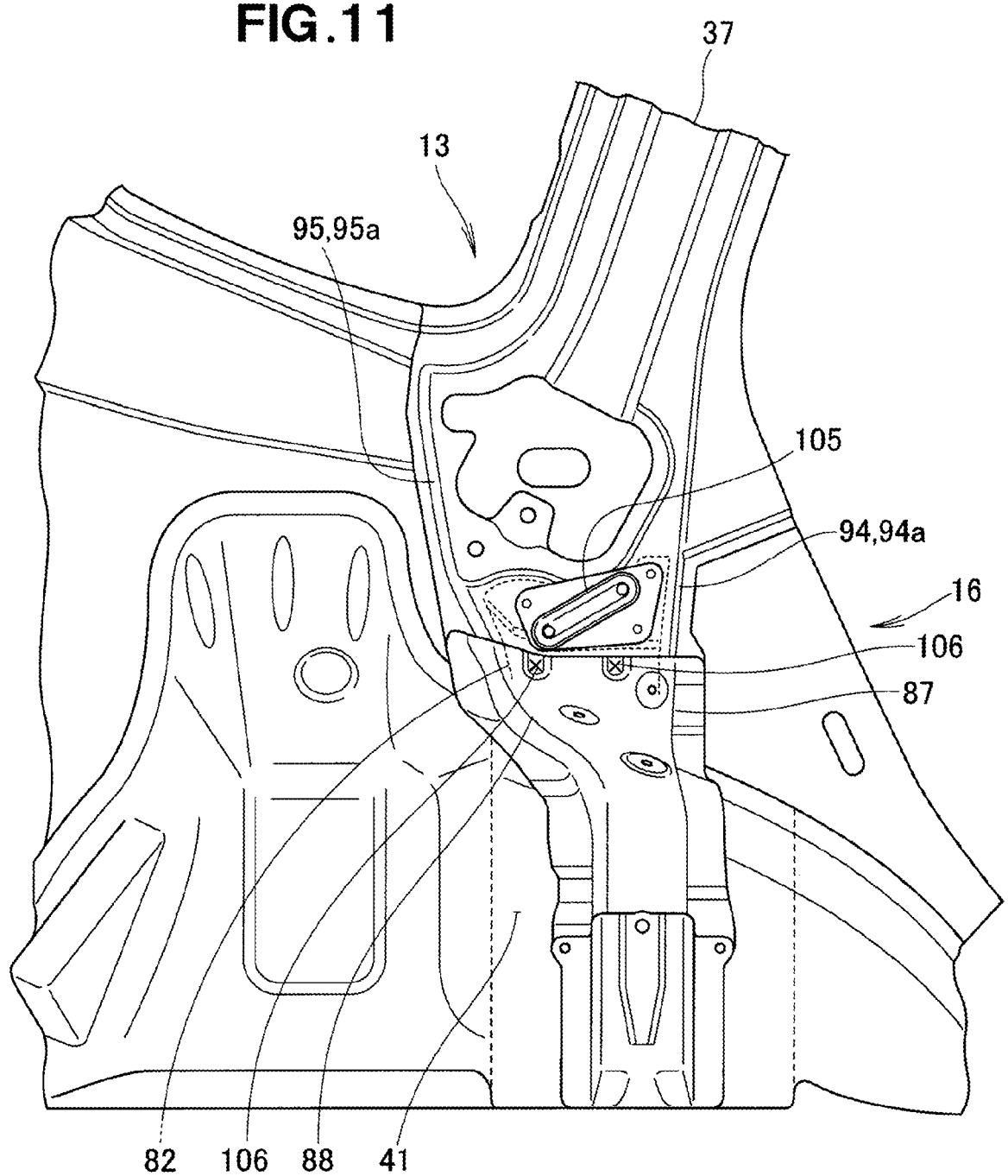
FIG. 11 is a view showing a striker mounted on a reinforcing member of the rear side section via an inner pillar member.

The following describe in greater detail the side vehicle body section 13 with reference to FIGS. 3, 10 and 11. The side vehicle body section 13 includes the above-mentioned reinforcing member 82, inner pillar member 51 and pillar stiffener 52 of the pillar (quarter pillar) 37, upper stiffener 43, lower stiffener (lower wheel house stiffener) 44 and wheel house gusset 42.

Figure 4:
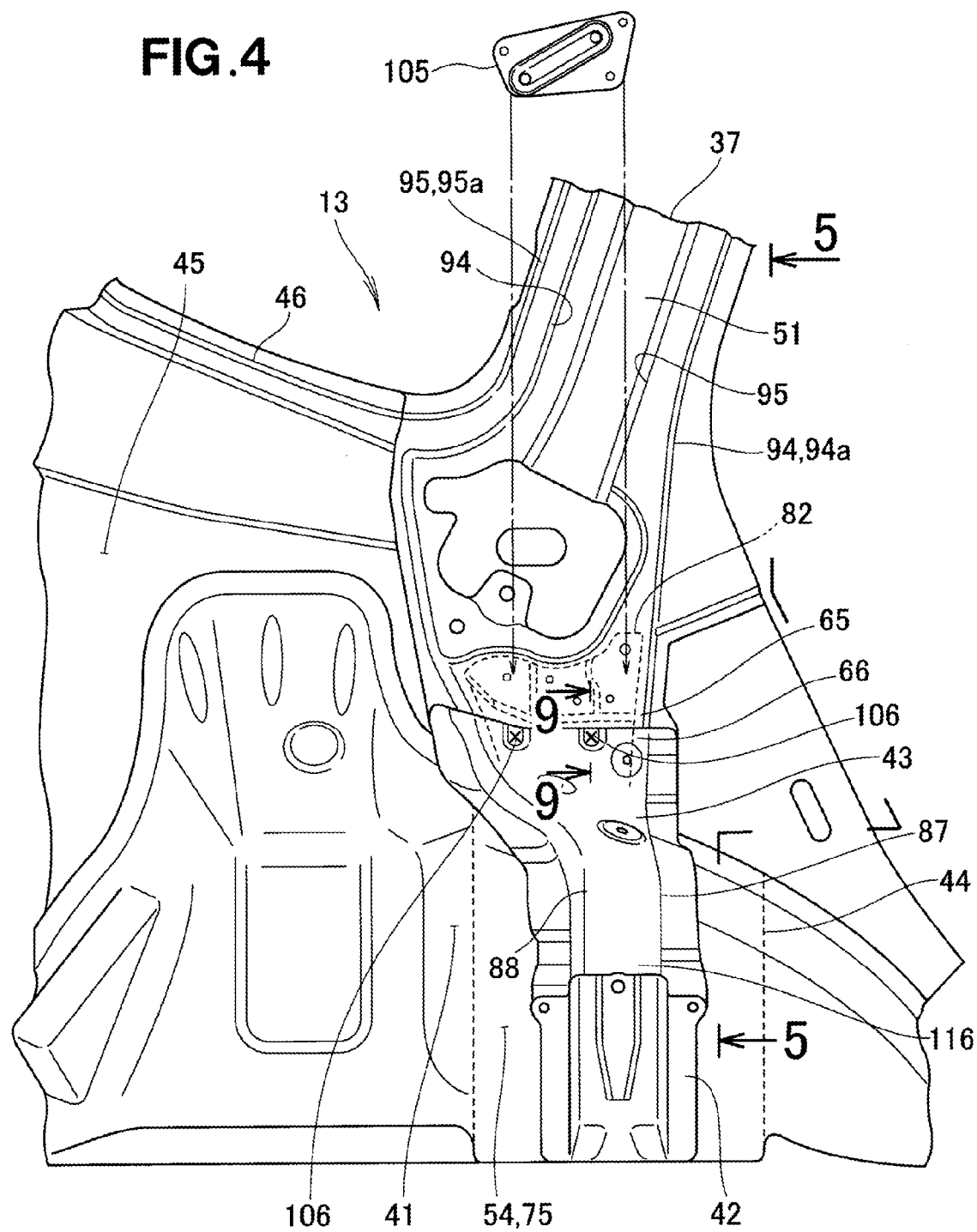
FIG. 4 is a view taken in a direction of arrow 4 of FIG. 1.
Figure 5:
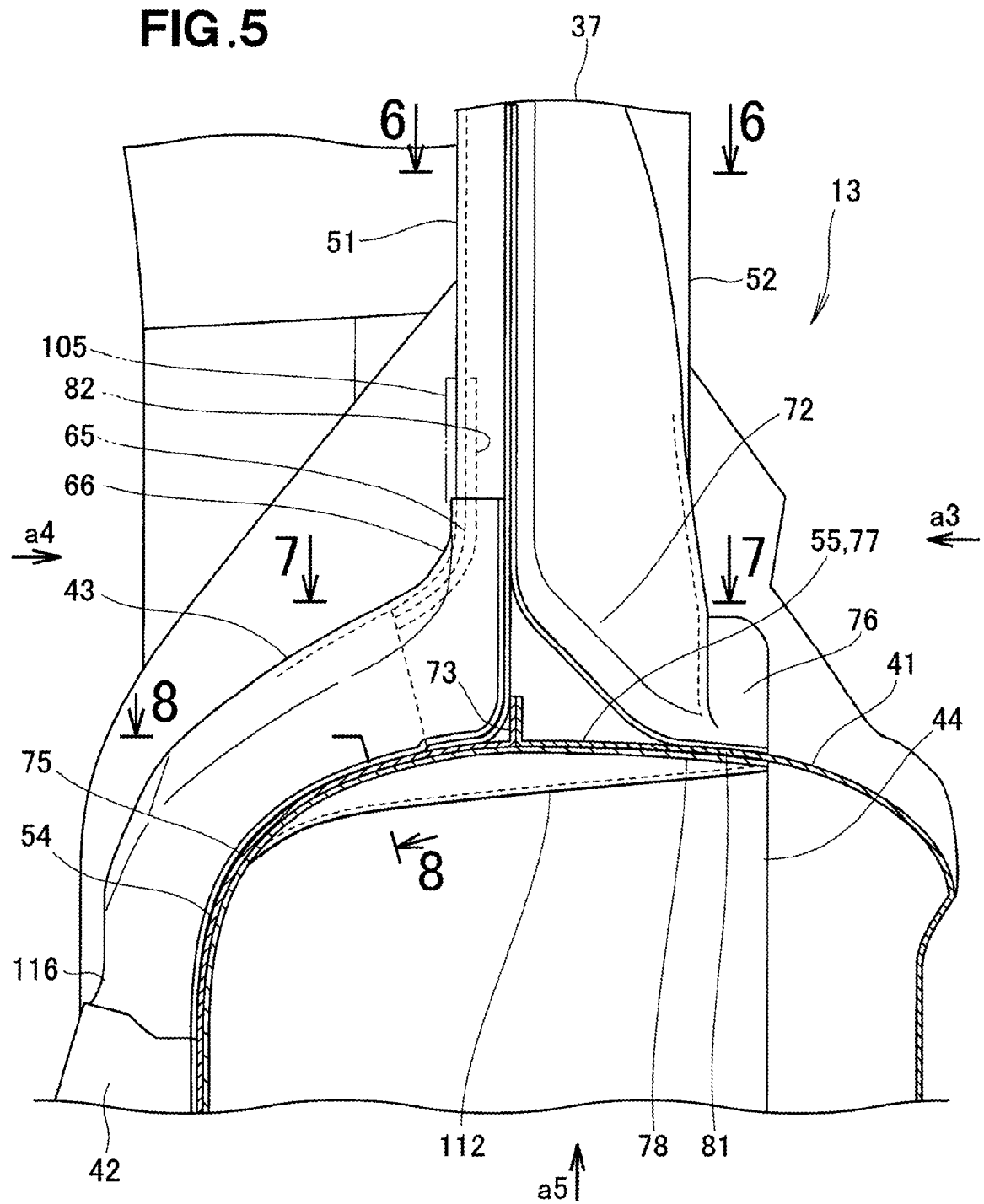
FIG. 5 is an enlarged sectional view taken along line 5-5 of FIG. 4.
Figure 9:
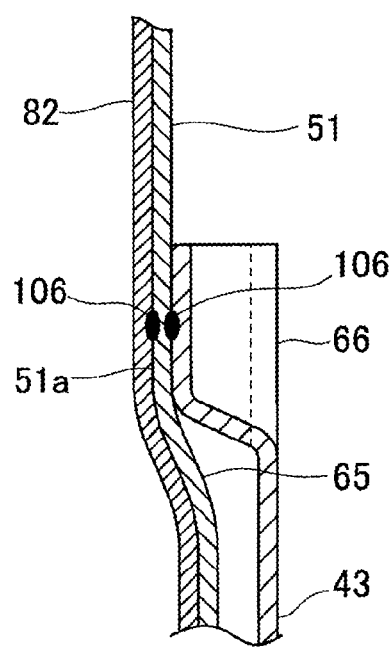
FIG. 9 is an enlarged sectional view taken along line 9-9 of FIG. 4.

The reinforcing member 82 is a bracket for mounting thereon a striker 105 (FIGS. 4 and 11) for a not-shown rear seat. The striker 105 operates to engage the seatback of the rear seat in an upright position. The reinforcing member 82, the upper end (extension section 66) of the upper stiffener 43 and the lower end 65 (i.e., reverse side 51 of the lower end 65) of the inner pillar member 51 are overlapped on one another (FIGS. 3, 5 and 9) and joined together by spot welding at a welding section 106 (FIGS. 4 and 9).

Further, in the quarter pillar 37, as shown in FIG. 6, the pillar ridge line sections 94a and 95b of the inner pillar member 51 are located at a position substantially opposed to ridge line sections 108 and 111 of the pillar stiffener 52, and the pillar ridge line section 94b is located at a position substantially opposed to a pillar stiffener ridge line section 112.

Further, as shown in FIG. 8, the upper ridge line section 87 of the upper stiffener 43 is located at a position substantially opposed to a ridge line section 112 of the lower stiffener (lower wheel house stiffener) 44, and the upper ridge line section 88 is located at a position substantially opposed to ridge line sections 113 and 114 of the lower stiffener 44.

Further, as shown in FIGS. 1 and 3, the side vehicle body section 13 includes the wheel house gusset 42 extending from a lower end portion 116 of the upper stiffener 43 to an upper portion 117 of the rear side frame 21.

The wheel house gusset 42 connects to the upper stiffener 43 and is joined at its lower portion to the rear side frame 21 and rear floor cross member 22. As shown in FIG. 8, the wheel house gusset 42 has a substantially U sectional shape and gusset ridge line sections 118 and 121. The gusset ridge line section 118 and the upper ridge line section 87 of the upper stiffener 43 connect with each other, while the gusset ridge line section 121 and the upper ridge line section 88 of the upper stiffener 43 connect with each other.

The wheel house gusset 42 defines a closed-sectional shape in conjunction with the inner wheel house member 54 as shown in FIG. 2, and the closed-sectional shape extends from the upper stiffener 43 to the rear side frame 21 and then connects to the rear floor cross member 22 via the rear side frame 21 and rear floor panel 23 as shown in FIGS. 1 to 3.

As noted above, the rear floor cross member 22 includes the upper floor cross member element 31 disposed on the upper surface of the rear floor panel 23, and the lower floor cross member element 32 disposed on the lower surface of the rear floor panel 23. A front wall 123 of the upper floor cross member element 31 and a front wall 124 of the lower floor cross member element 32 extend generally in vertical straight alignment with each other (see FIGS. 1 and 10), and a rear front wall 125 of the upper rear floor cross member element 31 and a rear wall 126 of the lower rear floor cross member element 32 connect with each other generally in vertical straight alignment with each other.

Further, in the pillar (quarter pillar) 37, as shown in FIGS. 1 and 2, the upper end 96 extends in the front-rear direction of the vehicle 11 to be joined to the roof side rail 58, and the pillar ridge line sections 94 (94a) and 95 (95a) of the inner pillar member 51 not only connect to a ridge line of the roof side rail 58 but also extend via the roof side rail 58 toward the roof arches 61 as indicated by arrows a6 and a7 in FIG. 10.

Further, in the side vehicle body section 13, the pillar (quarter pillar 37), the upper stiffener 43, the lower stiffener (lower wheel house stiffener) 44 and the wheel house gusset 42 together constitute a part of an annular framework of the vehicle body.

As shown in FIG. 2, the annular framework of the vehicle body comprises the roof arches 61, the pillar (quarter pillar) 37, the left and right upper stiffeners 43, the left and right lower stiffeners (lower wheel house stiffeners) 44, the left and right wheel house gusset 42, and the rear floor cross member 22.

Further, as shown in FIGS. 2 and 3, the underbody 15 includes damper mounting sections 131 provided outside the rear side frames 21 and on an extension line of the rear floor cross member 22. Each of the damper mounting sections 131 is disposed between the rear wheel house 41 (including the lower wheel house stiffener 44) and the wheel house gusset 42. The damper mounting section 131 functions also as a damper supporting point. Further, the damper mounting section 131 mounts thereon an upper portion of a damper of a not-shown rear suspension.

Next, a description will be given about behavior of the side vehicle body section 13 in the instant embodiment, staring with a description about a mechanism provided in the side vehicle body section 13 for increasing the strength of the vehicle body 12.

In the side vehicle body section 13, as shown in FIG. 2, when a load has been input from the road wheel to the damper mounting section 131 near the rear wheel house 41 as indicated by arrow b1, the input load sequentially transmits to the rear wheel house 41, the upper stiffener 43 and the pillar (quarter pillar) 37 in the order mentioned. During that time, the input load disperses while transmitting to the inner pillar member 51 because the inner pillar member 51 of the pillar (quarter pillar) 37 is connected integrally to the upper stiffener 43. Thus, the side vehicle body section 13 can advantageously increase traveling stability of the vehicle body and reduce vibrations of the vehicle.

Further, as shown in FIG. 3, when a load has been input as indicated by arrow b1, the input load can be dispersed by being transmitted to the pillar (quarter pillar) 37 as indicated by arrows b4 and b5 via the extension section connecting the second closed-sectional portion 71 to the first closed-sectional portion 67 as well as the lower end extension of the pillar stiffer. As a consequence, it is possible to even further increase the vertical (up-down) rigidity and strength from the rear wheel house to the pillar.

Further, the first closed-sectional portion 67 and the second closed-sectional portion 71 can be formed in such a manner as to connect with each other by the lower stiffener (lower wheel house stiffener) 44 via the inner rear wheel house member 54 and the outer rear wheel house member 55. Thus, it is possible to even further increase the vertical (up-down) rigidity and strength from the rear wheel house 41 to the pillar (quarter pillar) 37 and lateral (left-right) rigidity and strength from the inner rear wheel house member 54 to the outer rear wheel house member 55.

It should be appreciated that the upper stiffener 43, the inner pillar 51, pillar stiffener 52, the lower stiffener (lower wheel house stiffener) 44 are not necessarily limited to the substantially U shapes alone.

INDUSTRIAL APPLICABILITY

The side vehicle body structure of the present invention is well suited for application to automotive vehicles.

LEGEND

12 . . . vehicle body, 13 . . . side vehicle body section, 14 . . . floor section (underbody), 21 . . . vehicle-widthwise outer side portion (rear side frame), 37 . . . pillar (quarter pillar), 41 . . . rear wheel house, 43 upper stiffener, 44 . . . lower stiffener (lower wheel house stiffener), 51 . . . inner pillar member, 52 . . . pillar stiffener, 54 . . . inner rear wheel house member, 55 . . . outer rear wheel house member, 58 . . . roof side rail, 65 . . . lower end of the inner pillar member, 66 . . . extension section, 67 . . . first closed-sectional portion, 68 . . . opening of the inner pillar member, 71 . . . second closed-sectional portion, 72 . . . lower-end extension of the pillar stiffener, 73 . . . end of the inner rear wheel house member, 76 lower end of the lower-end extension, 77 . . . upper surface of the outer rear wheel house member, 78 . . . vehicle-width outer side portion of the lower stiffener, 81 . . . joint portion of the outer rear wheel house member, 82 . . . reinforcing member, 84 . . . first upper section section, 85 . . . second upper side section, 86 . . . third upper side section, 87 . . . upper ridge line section, 88 . . . upper ridge line section, 91 . . . first pillar side section, 92 . . . second pillar side section, 93 . . . third pillar side section, 94 . . . pillar ridge line section, 95 . . . pillar ridge line section, 96 . . . upper end of the pillar

The invention claimed is:

1. A side vehicle body structure comprising:
left and right rear wheel houses extending upward from vehicle-widthwise outer side portions of a floor section constituting a rear floor of a vehicle body;
upper stiffeners joined to corresponding ones of the rear wheel houses and protruding toward a middle of a passenger compartment; and pillars extending upward from the corresponding ones of the rear wheel houses, each of the pillars including an inner pillar member protruding toward the middle of the passenger compartment, each of the upper stiffeners having an extension section extending upward from the corresponding rear wheel house to be superposed on a lower end of the inner pillar member so that the upper stiffener connects to the inner pillar member via the extension section, wherein each of the rear wheel houses has a first closed-sectional portion formed by the upper stiffener being joined thereto, each of the pillars includes a pillar stiffener closing an opening of the inner pillar member by being joined to an outside of a passenger compartment in opposed relation to the inner pillar member, and a second closed-sectional portion defined by the inner pillar member and the pillar stiffener and extending in an up-down direction of the side vehicle body structure, and the pillar stiffener includes a lower-end extension extending downward beyond the lower end of the inner pillar member, the lower-end extension being located in overlapping relation to the extension section of the upper stiffener, wherein each of the rear wheel houses includes an inner rear wheel house member disposed proximate to the passenger compartment, an outer rear wheel house member disposed outside of the passenger compartment and joined to an end portion of the inner rear wheel house member, and a lower wheel house stiffener joined from below to the inner rear wheel house member and the outer rear wheel house member in superposed relation to the inner rear wheel house member and the outer rear wheel house member, and wherein the upper stiffener is disposed on a surface of the inner rear wheel house member facing toward the passenger compartment, the lower-end extension of the pillar stiffener has a lower end joined to an upper surface of the outer rear wheel house member, and the lower wheel house stiffener extends to overlap the upper stiffener and the pillar and has a vehicle-widthwise outer side portion extending to a joint portion between the outer rear wheel house member and the lower-end-extension of the pillar stiffener, the vehicle-widthwise outer side portion, the outer rear wheel house member and the lower-end-extension of the pillar stiffener being joined together with the outer rear wheel house member disposed between the vehicle-widthwise outer side portion and the lower-end-extension of the pillar stiffener.

2. The side vehicle body structure according to claim 1, wherein the inner pillar member has a reinforcing member for reinforcing the lower end thereof on which the extension section is superposed, the reinforcing member, the lower end of the inner pillar member, and the extension section of the outer stiffener being joined together with the lower end of the inner pillar member disposed between the reinforcing member and the extension section of the outer stiffener.

3. The side vehicle body structure according to claim 1, wherein the upper stiffener has a substantially U sectional shape defined by: a first upper side section; a second upper side section opposed to the first upper side section; a third upper side section extending from the first upper side section to the second upper side section; and an upper ridge line section defined by respective ridge lines of the first, second and third upper side sections, and the inner pillar member has a substantially U sectional shape defined by: a first pillar side section; a second pillar side section opposed to the first pillar side section; a third pillar side section extending from the first pillar side section to the second pillar side section; and a pillar ridge line section defined by respective ridge lines of the first, second and third pillar side sections, the upper ridge line section and the pillar ridge line section connect with each other.

4. The side vehicle body structure according to claim 3, further comprising a roof side rail connected to an upper end of the pillar, wherein the pillar ridge line section of the inner pillar member curves forward or rearward along a longitudinal direction of the roof side rail.

* * * * *